(12) United States Patent
McKay et al.

(10) Patent No.: US 8,331,429 B2
(45) Date of Patent: Dec. 11, 2012

(54) APPARATUS AND METHODS FOR IMPROVED HIGH-SPEED COMMUNICATION SYSTEMS

(75) Inventors: Luke E. McKay, Rose Hill, KS (US); Carl Gygi, Colorado Springs, CO (US); Brian K. Einsweiler, Colorado Springs, CO (US); Brian J. Varney, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 434 days.

(21) Appl. No.: 12/613,416

(22) Filed: Nov. 5, 2009

(65) Prior Publication Data

US 2011/0103439 A1    May 5, 2011

(51) Int. Cl.
*H04B 1/38* (2006.01)
*H04L 5/16* (2006.01)

(52) U.S. Cl. ........ 375/222; 375/219; 375/220; 375/285; 370/276; 370/280

(58) Field of Classification Search .......... 375/222, 375/219, 220, 221, 346, 350, 285; 370/276, 370/280
See application file for complete search history.

(56) References Cited

U.S. PATENT DOCUMENTS 8,098,602 B2 * 1/2012 Wu et al. ............... 370/280
2005/0030910 A1 * 2/2005 Robertson et al. ...... 370/276

* cited by examiner

*Primary Examiner* — Phuong Phu
(74) *Attorney, Agent, or Firm* — Duft Bornsen & Fishman LLP

(57) ABSTRACT

Apparatus and methods for improved high-speed communication by exchanging low-speed information regarding the high-speed exchanges over the same communication medium. In one exemplary embodiment, a communication device includes a high-speed transceiver adapted to exchange high-speed data with another device via a communication medium using high-frequency signals. The device also includes a low-speed component adapted to exchange low-speed information over the same communication medium as low-frequency signals. The low-frequency signals may be applied as common mode signals to a differential communication path so as to not interfere with the high-speed data exchanges. In another embodiment, a high-pass filter may be included in the device to remove the low-frequency signals before the high-speed data is applied to the high-speed transceiver. Responsive to receipt of the low-speed information, a device may adjust parameters of the transceiver to improve the high-speed data exchanges.

14 Claims, 3 Drawing Sheets

APPARATUS AND METHODS FOR IMPROVED HIGH-SPEED COMMUNICATION SYSTEMS

BACKGROUND

1. Field of the Invention

The invention relates generally to high-speed serial communication systems and more specifically relates to apparatus and methods in high-speed serial communication systems to use a low-speed communication channel to adapt transceiver parameters of the high-speed communication devices.

2. Discussion of Related Art

High-speed serial communications have become common in a number of electronic data communication applications. As compared to the higher pin/conductor count of parallel cabling connections, high-speed serial connections permit simpler, less expensive cabling and also allow for dramatically extended distances in communications between two devices. By way of example, Serial Attached SCSI (SAS) and Peripheral Component Interconnect (PCI) Express standards utilize a high-speed serial communication medium to interconnect devices.

Typically in devices utilizing high-speed serial communication, each device includes a high-speed transceiver circuit responsible for the physical application and sensing of electrical signals on the high-speed communication medium utilized to interconnect two devices. The transceiver is instructed by higher layers of logic circuits (responsible for the particular communication application) to transmit information over the communication medium as high-frequency (hence high-speed) signals and senses signals received on the communication medium interpreted as data to be passed on to the higher layer logic circuits for further processing.

Although such high-speed communication applications provide impressive reliability, over longer distances externally generated noise, mismatched impedance, and other factors can interfere with the high-frequency signaling used for such high-speed communications. Often the transceiver circuits include programmable parameters to control electrical characteristics of the signals to be applied to the communication medium. Some transceivers may also include programmable parameters relating to the receiver operations of the transceiver to sense/interpret signals on the communication medium transmitted from the other device. Manufacturers of such high-speed serial communication devices typically provide default values/settings for such programmable parameters at the time of manufacture. In some cases, an administrative user may utilize an administrative tool provided by the manufacturer to modify some/all of the programmable parameters if the administrator senses that a particular communication link has too many errors or is otherwise performing unacceptably. However, such a manual (administrative user) tuning procedure to improve the quality of high-speed data exchanges is both cumbersome and error-prone.

Thus it is an ongoing challenge to improve the quality of exchanges in high-speed serial communication applications.

SUMMARY

The present invention solves the above and other problems, thereby advancing the state of the useful arts, by providing apparatus and methods for exchanging low-speed information over the same communication medium as the high-speed data exchanges in a high-speed data communication system. The low-speed information is automatically generated by one of the devices to indicate detection of a problem in the high-speed data exchanges. The device in receipt of such low-speed information may then adjust its programmable parameters for the high-speed transceiver to attempt to correct detected problems. The low-speed information is applied to the communication medium as low-frequency signals in such a manner as to not interfere with the high-frequency signals utilized to exchange the high-speed data.

In one aspect hereof, a communication system is provided. The high-speed serial data communication system includes a first device having a first high-speed transceiver having programmable parameters to control transmissions and a first low-speed component coupled with the first high-speed transceiver to program the programmable parameters. The system also includes a second device having a second high-speed transceiver having status information regarding communication exchanges with another device and a second low-speed component coupled with the second high-speed transceiver to receive the status information. The system further includes a communication medium interconnecting the first and second high-speed transceivers and interconnecting the first and second low-speed components. The first and second devices are adapted to exchange high-speed data via the communication medium and the first and second high-speed transceivers. The first and second devices are also adapted to exchange low-speed information via the communication medium and the first and second low-speed components. The low-speed information includes information regarding status of exchanges of high-speed data between the first and second devices via the communication medium. The low-speed information is based on the status information. The first low-speed component is adapted to adjust parameters of the first high-speed transceiver in response to the low-speed information exchanged with the second low-speed component.

Another aspect hereof provides a communication device that includes a high-speed transceiver adapted to couple with a communication medium and adapted to exchange high-speed data with another device over the communication medium. The high-speed transceiver includes programmable parameters for controlling operation of the transceiver in transmitting and/or receiving the high-speed information. The device also includes a low-speed component adapted for coupling to the communication medium and adapted to receive low-speed information from another communication device over the communication medium. The low-speed component is further adapted to adjust the programmable parameters of the high-speed transceiver in response to the received low-speed information.

Yet another aspect hereof provides a method of operating a high-speed serial data communication system. The system includes a first and second device coupled by a communication medium. Each device includes a high-speed transceiver coupled to the communication medium and each device includes a low-speed component coupled to the communication medium. The method includes exchanging low-speed information between the devices via the low-speed components in each device over the communication medium and exchanging high-speed data between the devices via the high-speed transceivers over the communication medium. The low-speed information includes information relating to status of exchanges of high-speed data between the devices via the communication medium. The low-speed information is based on the status information. The method also includes adjusting transmission parameters of the high-speed transceiver in a transmitting device of the devices in response to receipt of the low-speed information.

DETAILED DESCRIPTION OF THE DRAWINGS

Figure 1:
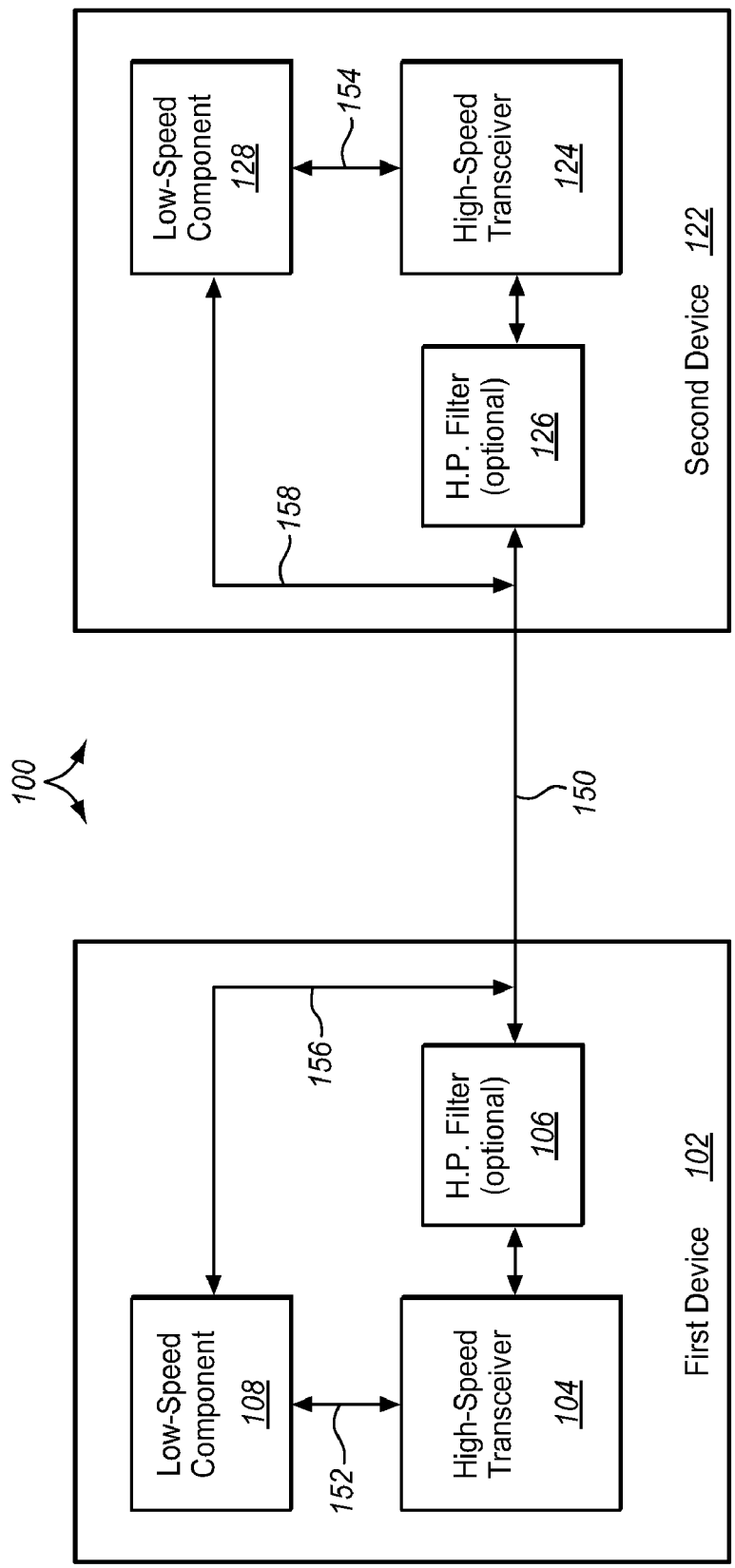
FIG. 1 is a block diagram of an exemplary high-speed communication system utilizing low-speed information exchanged on the same communication medium as the high-speed data in accordance with features and aspects hereof.

FIG. 1 is a block diagram of a high-speed serial data communication system 100 including a first device 102 coupled with a second device 102 via communication medium 150. First device 102 includes high-speed transceiver 104 and low-speed component 108. High-speed transceiver 104 and low-speed component 108 are both coupled with communication medium 150. In an exemplary optional embodiment discussed further herein below, high-speed transceiver 104 may be coupled with communication medium 150 via intervening high-pass filter 106. Second device 122 similarly includes a high-speed transceiver 124 and a low-speed component 128 both coupled with communication medium 150 where transceiver 124 may optionally be coupled with communication medium 150 via intervening high-pass filter 126. Low-speed component 108 in device 102 is also coupled with high-speed transceiver 104 via path 152 to allow access to programmable parameters and status information within high-speed transceiver 104. In like manner, low-speed component 128 is also coupled with high-speed transceiver 124 via path 154 to permit access by low-speed component 128 to programmable parameters and status information within high-speed transceiver 124. Low speed components 108 and 128 each include a low-speed transceiver for exchange of low-speed information and further include logic for interfacing with high-speed transceivers 104 and 124, respectively. The low-speed components 108 and 128 interface with high-speed transceivers 104 and 124, respectively, for purposes of determining the status of high-speed data exchanges and for purposes of re-programming parameters of the high-speed transceivers to improve the high-speed communication between the high-speed transceivers 104 and 124.

In operation of system 100, first device 102 and second device 122 exchange high-speed data via and respective high-speed transceivers 104 at 124 (optionally through high-pass filters 106 and 126). The high-speed data is generally applied to communication medium 150 as high-frequency electrical signals. By contrast, low-speed component 108 within first device 102 and low-speed component 128 within second device 122 may exchange low-speed information over the same communication medium 150. Low-speed information exchanged between low-speed components 108 and 128 of devices 102 and 122, respectively, includes information relating to the status of the exchanges of high-speed data between devices 102 and 122.

In particular, in one exemplary embodiment, a receiving device (e.g., 122) may include status information within its high-speed transceiver 124 indicating the status of exchanges of high-speed data via communication path 150. Such information may include status indicators regarding the quality of received signals, the very presence of any received signals, error indicators and/or counters, etc. Based on such status information, low-speed component 128 may determine that a problem exists in the transmission of high-speed data generated by first device 102. In response to detecting such problems, low-speed component 128 generates low-speed information indicating the detection of such a problem and applies the low-speed information (e.g., as low-frequency electrical signals) to communication medium 150 via path 158 for receipt by low-speed component 108 in first device 102 via path 156. Responsive to receipt of such low-speed information, low-speed component 108 may adjust programmable transmit related parameters of high-speed transceiver 104 within first device 102 to correct for the detected problems. Programmable parameters of transceiver 104 may include, for example, the electrical amplitude of signals applied to communication medium 150, timing de-skew of signals applied to communication medium 150, and other exemplary parameters of transmission provided as programmable parameters of the transceiver.

Low-speed information is generally applied to communication medium 150 as low-frequency signals in a manner so as to not interfere with the high-speed data applied to communication medium 150 as high-frequency signals. In one exemplary embodiment, a receiving device may include a high-pass filter component (e.g., 106 in first device 102 and 126 and second device 122) to remove the low-frequency, low-speed information from the signals on communication path 150 as applied to a receiving transceiver (e.g., high-speed transceiver 104 in first device 102 and 124 in second device 122). Thus the low-speed information exchanged between low-speed components 108 and 128 will not interfere with the high-speed data exchanges performed between high-speed transceivers 104 and 124 of devices 102 and 122, respectively, despite the application of both signals to the common communication medium 150. In another exemplary embodiment, communication medium 150 may comprise a differential communication medium including a pair of conductors. Signals relating to the high-speed data exchanges may be applied to the differential communication medium as differential voltage signals across the pair of conductors. In such a differential communication medium embodiment, the low-speed information may be applied to both conductors of the differential communication medium and thus appears as common mode noise easily rejected by the differential circuits of the receiving high-speed transceiver (104 or 124). In such a differential communication medium, the high-pass filter 106 or 126 may not be required since the common mode noise representing the low-speed information is easily rejected by the differential operation of the transceivers 104 at 124. The low-speed information so applied as common mode signals to differential communication medium 150 may be sensed by a receiving low-speed component (e.g., 108 or 128) as single ended signals (single ended signals relative to ground potential).

It will be readily recognized by those of ordinary skill in the art that programmable parameters of the high-speed transceivers 104 and/or 124 may also be programmed to adjust characteristics of the receiving operation of the transceiver. Thus the low-speed information exchange between low-speed components 108 and 128 may also be utilized to adjust receiver operation related programmable parameters of devices 102 and 122.

Figure 2:
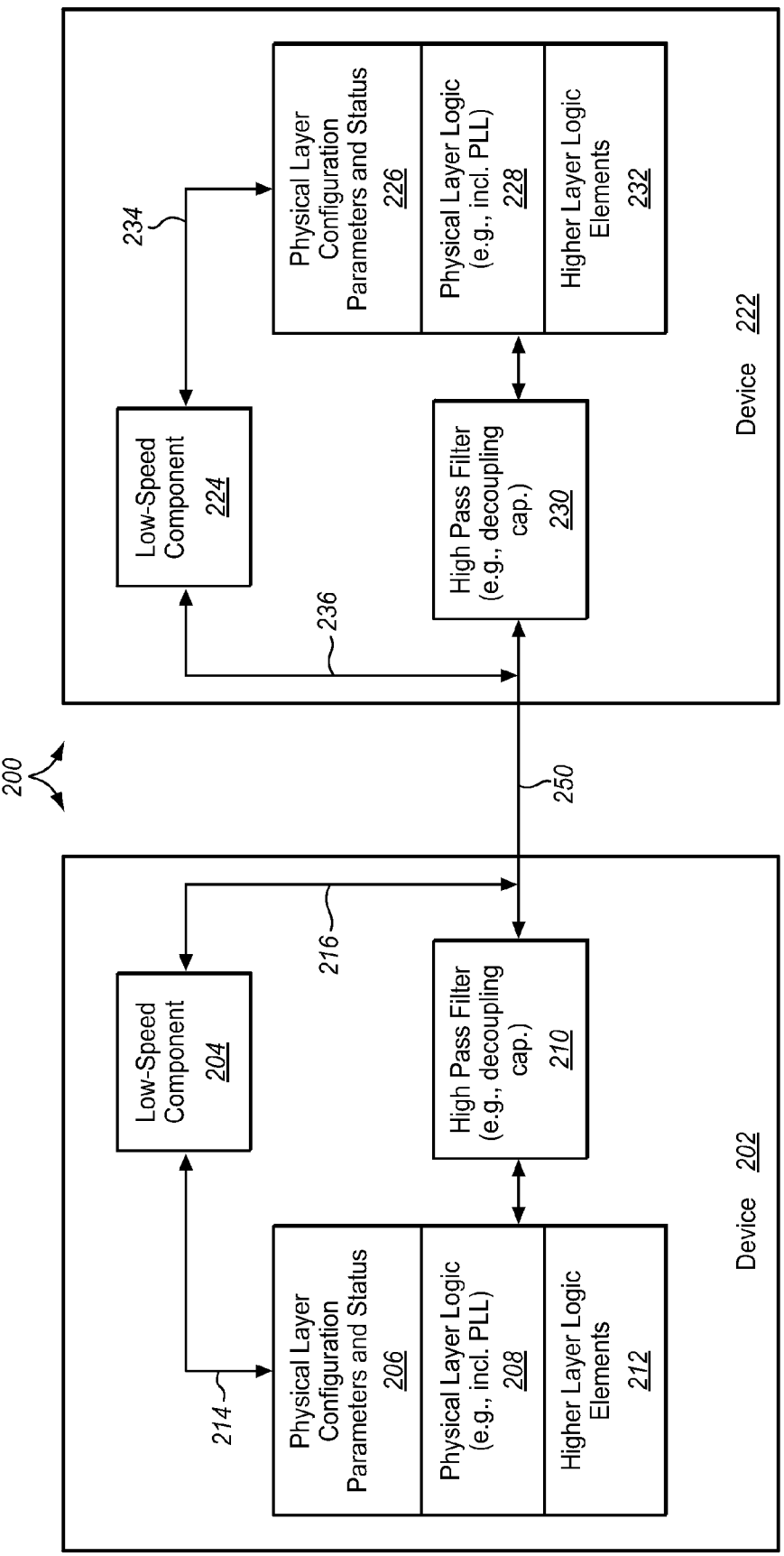
FIG. 2 is a block diagram of another exemplary high-speed communication system utilizing low-speed information exchanged on the same communication medium as the high-speed data in accordance with features and aspects hereof.

FIG. 2 is a block diagram of an exemplary embodiment of a high-speed communication system 200 applying features and aspects hereof in the context of Serial Attached SCSI (SAS) and/or PCI Express applications. Both SAS and PCI Express utilize high-speed serial communication paths to exchange high-speed data between two devices. In addition, both SAS and PCI Express are modeled after standard layered networking protocol stacks in which a lowest or physical layer performs the actual exchange of information over a communication medium while higher layers of logic provide higher layer transport and application functions for the exchange of information between two devices.

High-speed communications system 200 includes a first device 202 and a second device 222 coupled via communication medium 250. By way of example, both SAS and PCI Express standards utilize high-frequency differential signaling standards on a communication medium 250 coupling the devices. In addition, communication medium 250 may be either half duplex or full duplex in accordance with various communication standards. Device 202 includes low-speed component 204 coupled via path 216 to communication medium 250 for the exchange of low-speed information with low-speed transceiver 224 in device 222 via path 236. Physical layer logic 208 in device 202 includes transceiver logic for transmission and reception of high-speed data exchanged with corresponding physical layer logic 228 of device 222 via communication medium 250. The high-speed data so exchanged between the physical layer logic elements 208 and 228 is passed on to higher layer logic elements two eight 212 and 232 for further processing in accordance with the protocols utilized and the particular communication application. Such higher layer logic elements in SAS and PCI Express are well known to those of ordinary skill in the art as expressed in the SAS and PCI Express specifications (publicly available at, for example, www.t10.org and www.picsig.com respectively).

The physical layer logic 208 and 228 is often implemented as an integrated circuit sometimes combining features of the higher layer logic elements 212 and 232. In most cases, the integrated circuit comprising the physical layer logic 208 and 228 includes configuration parameters and status 206 and 226, respectively. For example the Gigablaze® circuit from LSI Corporation includes programmable parameters for amplitude of transmitted signals as well as timing de-skew timing of transmitted signals. Other commercially available circuits implementing the physical layer logic 208 and 228 may include these and/or other programmable parameters relating to transmission generated by the circuit. Still further, some transceiver circuits may include programmable parameters affecting the receiving aspects of the transceiver logic (physical layer logic 208 and 228).

In most physical layer logic circuits 208 and 228 (e.g., most high-speed transceiver circuits), circuits 206 and 226 may include status information regarding status of the receiver operation of the transceiver circuits 208 and 228. Low-speed component 204 in device 202 may access the configuration parameters and status 206 via path 214. In like manner, low-speed component 224 may access configuration parameters and status 226 of device 222 via path 234. The low-speed components access the configuration parameters and status information to retrieve status information for purposes of analyzing performance of the high-speed data exchanges and for purposes of programming configuration parameters of the transceiver circuits. In operation, low-speed component 224 may access status information 226 associated with the transceiver operation in physical layer logic 228 of device 222. The status information may indicate, for example, detected errors or suspect conditions in the exchange of high-speed data between the transceivers 208 and 228 of devices 202 and 222, respectively. Based on such status information, low-speed component 224 may detect a problem in the exchange of high-speed data. In response to detecting such a problem, low-speed component 224 may generate low-speed information applied via path 236 to communication medium 250 for receipt by low-speed component 204 through path 216. Responsive to receipt of such low-speed information, low-speed component 204 may adapt (e.g., adjust or reprogram) configuration parameters and status 206 associated with transmission operations of transceiver 208 in device 202.

Such low-speed information is applied as low-frequency signals to communication medium 250. In the context of SAS and PCI Express applications where communication medium 250 comprises a differential communication path including a pair of conductors (or multiple pairs for full duplex), the high-speed data is applied as differential signals on the differential pair of conductors while the low-speed information is applied to both conductors and thus rejected by the high-speed transceivers 208 and 228 as common mode noise. These common mode signals may none the less be received as single ended signals by the low-speed components 204 and 224. Still further, in another exemplary embodiment common to the SAS and PCI Express applications, devices 202 and 222 each include a high-pass filter 210 and 230, respectively. The high-pass filter passes through high-frequency signals representing the high-speed data exchanged between transceivers 208 and 228 via communication medium 250 while rejecting low-frequency signals representing the low-speed information exchanged between low-speed components 204 and 224. In particular, in one exemplary embodiment, the SAS specifications require that each SAS device includes a decoupling capacitor as a high-pass filter 210 and 230. This decoupling capacitor rejects low-frequency noise in passing through the high-frequency high-speed data exchanges between transceivers 208 and 228 (e.g., between physical layer logic in the SAS or PCI Express application). Relying on such a filter, the low-speed information need not necessarily be applied to both conductors of a differential communication medium (such as in SAS or PCI Express). Rather, the low-speed information may be applied to a single conductor as low-frequency, single ended signals and the high-pass filtration will remove the low-frequency signals to pass on the high-frequency, high-speed data between the high-speed transceivers. By way of example, a high-pass filter may be used that removes signals having a frequency below about 500 kHz and passes through higher frequency signals over about 500 kHz. The specific threshold frequency may be selected according to the requirements of the specific high-speed communication application.

In an exemplary SAS application, each device (202 and 222) may be one of: a SAS initiator, a SAS target, and/or a SAS expander. In the context of an exemplary PCI Express application, each device (202 and 222) may be a PCI Express device and/or a PCI Express switch. Those of ordinary skill in the art will readily recognize numerous other applications that utilize high-speed serial communications over a communication medium in which a low-speed component may concurrently exchange information to adapt parameters of the high-speed transceivers in their exchange of high-speed data. Still further, those of ordinary skill in the art will readily recognize a number of commercially available circuits to provide the transceiver function in the low-speed components 204 and 224 of devices 202 and 222, respectively. For example, a transceiver component within the low-speed components 204 and 224 may implement the I²C protocol for exchange of the low-speed information. Numerous other standardized protocols and circuits will be readily apparent to those of ordinary skill in the art for implementation of transceiver functions in low-speed components 204 and 224 of devices 202 and 222, respectively.

Figure 3:
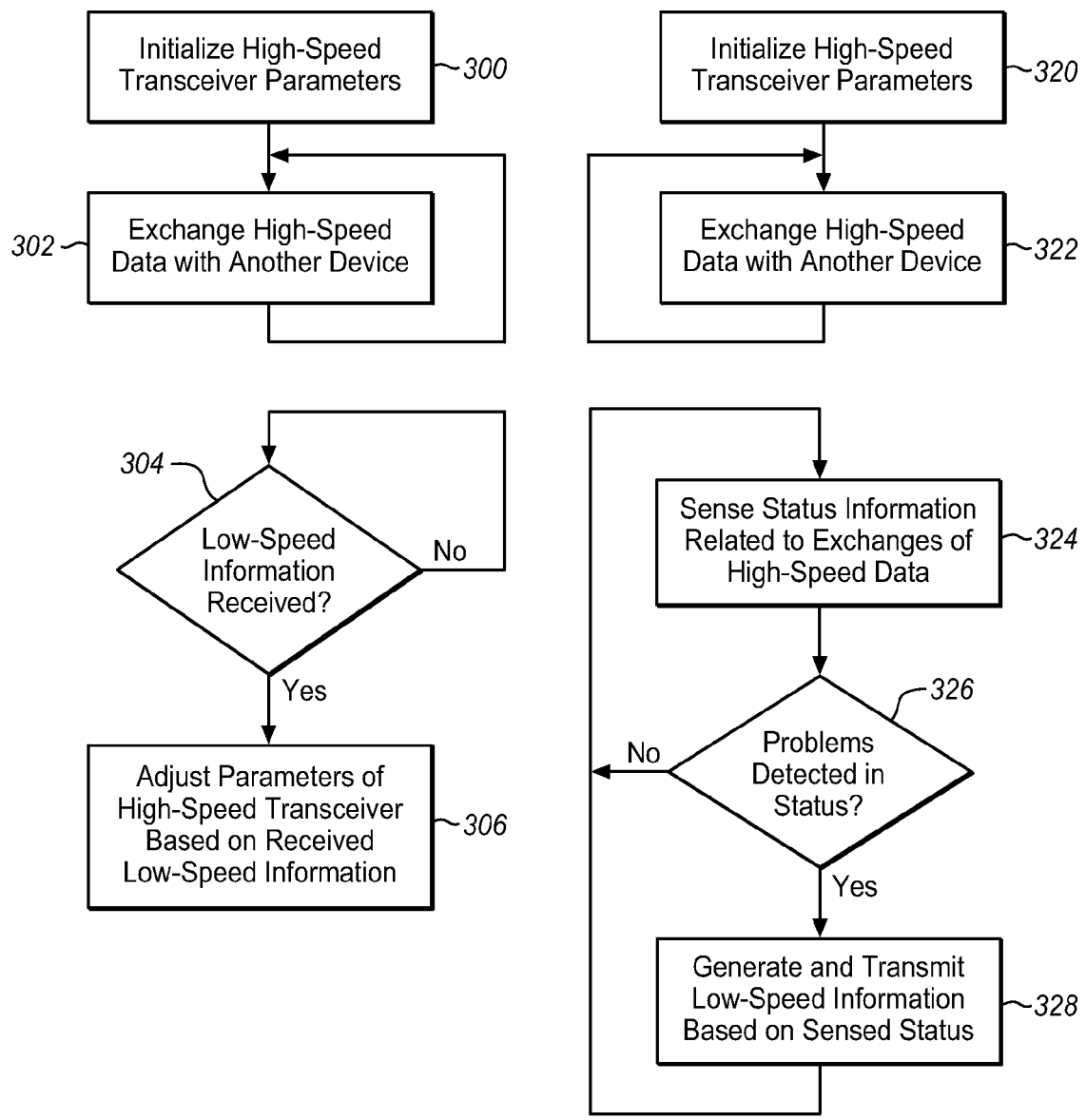
FIG. 3 depicts flowcharts describing exemplary methods of operating a high-speed communication system in accordance with features and aspects hereof.

FIG. 3 provides flowcharts describing exemplary methods in accordance with features and aspects hereof to provide a low-speed communication channel for exchanging information regarding status of high-speed communications exchanged over a common communication medium with the low-speed channel. Such low-speed information may then be utilized for adapting parameters of the high-speed transceivers used in the exchange of high-speed data to improve the quality and reliability of such exchanges.

Steps 300 through 306 represent exemplary steps performed within a first device operable for transmitting high-speed data. Step 300 first initializes the high-speed transceiver parameters in accordance with default operational characteristics of the high-speed transceiver. Such default parameter values may be defined by the manufacturer of the device and/or by an administrative user initially configuring the high-speed communication system. Step 302 then represents ongoing high-speed data exchanges with a second device of the system. Concurrently with the ongoing high-speed exchanges, step 304 is iteratively operable to await receipt of low-speed information from the second device indicating detection of some problem in the high-speed exchanges. Upon receipt of such low-speed information, step 306 analyzes the received low-speed information and determines appropriate adjustments of parameters of the high-speed transceiver. As noted above, exemplary programmable transmission parameters may include amplitude of the transmitted signal and/or timing de-skew of transmitted signals as well as other parameters specific to a particular high-speed transceiver circuit.

Steps 320 through 328 represent processing of the second device engaged in the exchange of high-speed data with the first device. Step 320 initializes the high-speed transceiver parameters in accordance with default operating standards as described above with respect to step 300. Step 322 then represents ongoing exchanges of high-speed data with the first device as described above with respect to step 302. Steps 324 through 328 are iteratively operable to sense status information of the high-speed transceiver relating to exchanges of high-speed data with the first device. As noted above, status information may include various indicators of operation of the receiving aspect of the high-speed transceiver including, for example, error indicators and/or counters indicative of errors in receipt of high-speed data from the first device. Step 326 then determines whether any problems are detected in the status information sensed by step 324. If not, processing continues looping back to step 324 to continue sensing status information substantially concurrently with the ongoing exchange of high-speed data with the first device. If step 326 determines that a problem is detected in the sensed status information, step 328 generates and transmits low-speed information based on the sensed status information and processing continues looping to step 324.

The generated low-speed information is applied to the same communication medium as is used for the exchange of high-speed data. The low-speed information is applied as low-frequency signals as compared to the high-frequency signals utilized for exchange of high-speed data. As noted above with respect to FIGS. 1 and 2, the low-frequency low-speed information may be applied to both conductors of a differential pair of conductors and is thus filtered or ignored by the high-speed differential transceivers. In other embodiments, a high-pass filter may be included in each device to allow only high-frequency signals representing the high-speed data to pass through to the high-speed transceivers with the low-frequency signals removed. The low-speed information is received by the low-speed transceiver devices in each of the first and second devices before it is passed through the high-pass filters.

Those of ordinary skill in the art will readily recognize numerous additional and equivalent steps in the flowchart of FIG. 3. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A high-speed serial data communication system comprising:
   a first device including:
      a first high-speed transceiver having programmable parameters to control transmissions; and
      a first low-speed component coupled with the first high-speed transceiver to program the programmable parameters;
   a second device including:
      a second high-speed transceiver having status information regarding communication exchanges with another device; and
      a second low-speed component coupled with the second high-speed transceiver to receive the status information; and
   a communication medium interconnecting the first and second high-speed transceivers and interconnecting the first and second low-speed components,
   wherein the first and second devices are adapted to exchange high-speed data via the communication medium and the first and second high-speed transceivers,
   wherein the first and second devices are adapted to exchange low-speed information via the communication medium and the first and second low-speed components, the low-speed information including information regarding status of exchanges of high-speed data between the first and second devices via the communication medium, the low-speed information based on the status information,
   wherein the first low-speed component is adapted to adjust parameters of the first high-speed transceiver in response to the low-speed information exchanged with the second low-speed component,
   wherein the communication medium further comprises a differential signaling pair of conductors,
   wherein the first and second high-speed transceivers both utilize differential signaling for high-speed information exchanged over the communication medium, and
   wherein the first and second low-speed components are adapted to exchange information by applying signals to both conductors of the differential signaling pair of conductors and are adapted to receive information as single ended signals from either of the conductors of the differential signaling pair of conductors.

2. The system of claim 1 further comprising:
   a first high-pass filter coupled between the first high-speed transceiver and the communication medium; and
   a second high-pass filter coupled between the second high-speed transceiver and the communication medium, wherein the first low-speed component and the second low-speed component are both coupled to the communication medium between the first and second high-pass filters, and wherein the first and second high-pass filters are adapted to permit high-speed-data to pass between the communication medium and the first and second transceivers and further adapted to remove the low-speed information exchanged between the first and second low-speed components.

3. The system of claim 2
wherein the first high-pass filter is a capacitor; and
wherein the second high-pass filter is a capacitor.

4. The system of claim 2
wherein the first and second high-pass filters are each adapted to pass through signals comprising the high-speed data and having a frequency higher than 100 kilohertz.

5. The system of claim 1
wherein the first and second devices are both Serial Attached SCSI (SAS) devices or are both Peripheral Component Interconnect (PCI) Express devices.

6. The system of claim 5
wherein the first and second devices are each comprise one of: a SAS initiator device, a SAS target device, or a SAS expander device.

7. A communication device comprising:
a high-speed transceiver adapted to couple with a communication medium and adapted to exchange high-speed data with another device over the communication medium, the high-speed transceiver comprising programmable parameters for controlling operation of the transceiver in transmitting and/or receiving the high-speed information; and
a low-speed component adapted for coupling to the communication medium and adapted to receive low-speed information from another communication device over the communication medium, the low-speed component further adapted to adjust the programmable parameters of the high-speed transceiver in response to the received low-speed information,
wherein the communication device is adapted to couple with a communication medium that comprises a differential signaling pair of conductors,
wherein the high-speed transceiver is adapted to utilize differential signaling in its exchange of high-speed data, and
wherein the low-speed component is adapted to exchange low-speed information by applying signals to both conductors of the differential signaling pair of conductors and further adapted to receive low-speed information as single ended signals from either of the conductors of the differential signaling pair of conductors.

8. The communication of claim 7 further comprising:
a high-pass filter adapted to couple the high-speed transceiver with the communication medium,
wherein the low-speed component is adapted to couple to the communication medium between the high-pass filter and the communication medium, and
wherein the high-pass filter is adapted to permit high-speed-data to pass between the communication medium and the high-speed transceiver.

9. The communication device of claim 8
wherein the high-pass filter is a capacitor.

10. The communication of claim 8
wherein the high-pass filter is adapted to pass through signals having frequencies higher than 100 kilohertz.

11. The communication device of claim 7
wherein the communication device comprises one of: a Serial Attached SCSI (SAS) initiator device, a SAS target device, a SAS expander device, or a Peripheral Component Interconnect (PCI) Express device.

12. The communication device of claim 7
wherein the high-speed transceiver further comprises status information regarding communication exchanges of high-speed data with another device,
wherein the low-speed component is coupled with the high-speed transceiver to receive the status information, and
wherein the low-speed component is further adapted to generate low-speed information based on the status information and is further adapted to apply the low-speed information to the communication medium for transmission to another device.

13. A method of operating a high-speed serial data communication system, the system including a first and second device coupled by a communication medium, each device including a high-speed transceiver coupled to the communication medium and each device including a low-speed component coupled to the communication medium, the method comprising the steps of:
exchanging low-speed information between the devices via the low-speed components in each device over the communication medium and exchanging high-speed data between the devices via the high-speed transceivers over the communication medium, the low-speed information comprising information relating to status of exchanges of high-speed data between the devices via the communication medium, the low-speed information based on the status information; and
adjusting transmission parameters of the high-speed transceiver in a transmitting device of the devices in response to receipt of the low-speed information,
wherein the communication medium comprises a differential communication path including pair of conductors and wherein the high-speed transceiver is a differential transceiver,
wherein the step of exchanging low-speed information further comprises:
applying the low-speed information as a common mode signal on both of the conductors of the differential communication path; and
receiving the low-speed information in the low-speed component of a receiving device of the devices as single ended signals,
wherein the low-speed information is rejected by the differential transceiver as common mode noise.

14. The method of claim 13 further comprising:
applying a high-pass filter to the exchanges of high-speed data to remove the low-speed information from application of signals on the communication medium to the high-speed transceiver of a receiving device of the devices.

* * * * *